United States Patent Office.

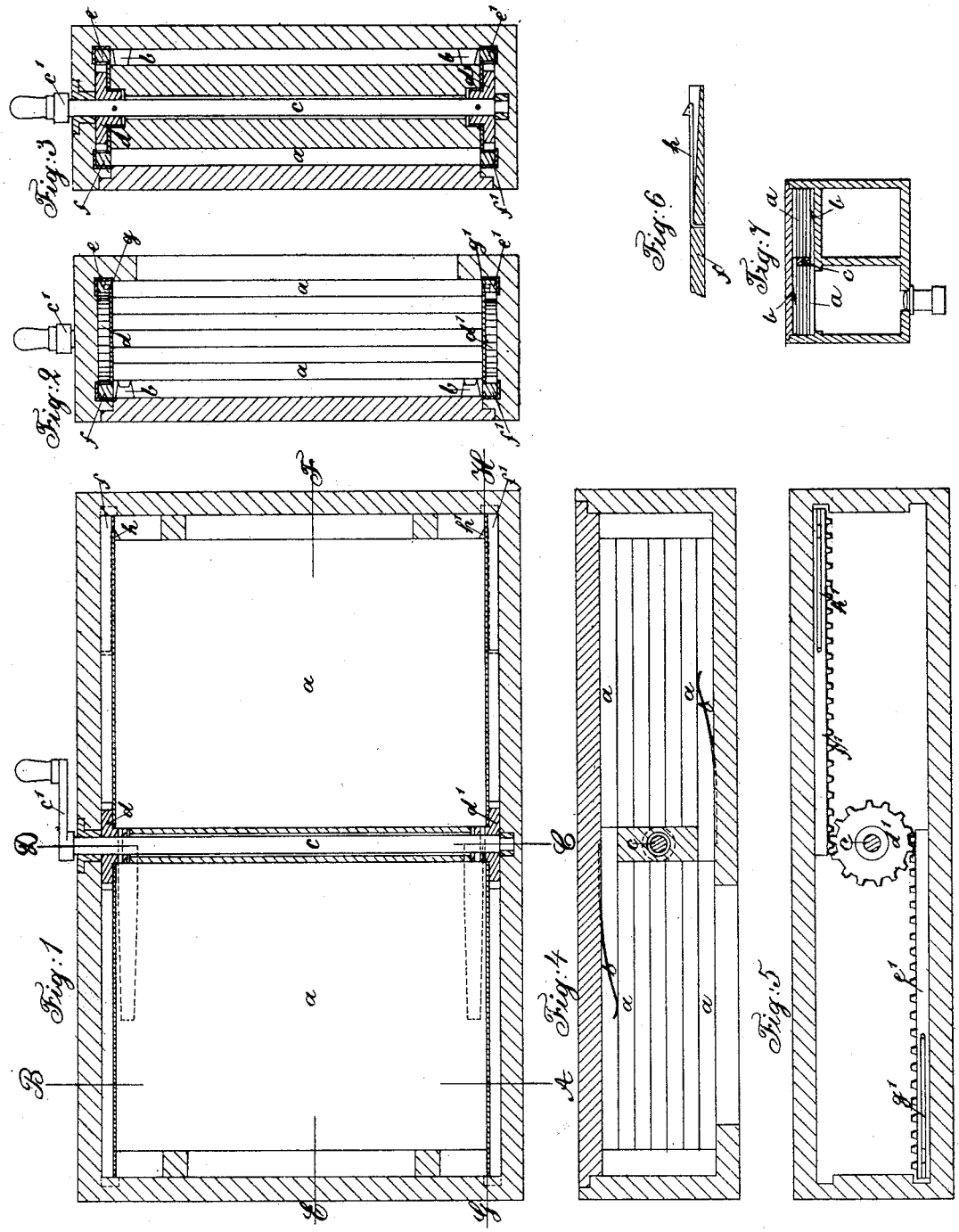

FRIEDRICH AUGUSTE FICHTNER, OF DRESDEN, GERMANY.

PHOTOGRAPHIC PLATE-CHANGING APPARATUS.

SPECIFICATION forming part of Letters Patent No. 472,702, dated April 12, 1892.

Application filed September 11, 1890. Serial No. 364,783. (No model.) Patented in Germany November 9, 1889, No. 51,977; in England January 15, 1890, No. 765; in Belgium January 16, 1890, No. 89,183; in France March 15, 1890, No. 202,756, and in Austria-Hungary April 27, 1890, No. 2,138 and No. 14,281.

*To all whom it may concern:*

Be it known that I, FRIEDRICH AUGUSTE FICHTNER, cabinet-maker, a subject of the Emperor of Germany, residing at 6 Elisenstrasse, Dresden, in the Kingdom of Saxony and Empire of Germany, have invented certain new and useful Improvements in Plate-Changing Apparatus for Photographic Cameras, of which the following is a specification.

The present invention is the subject-matter of Letters Patent of Germany, No. 51,977, dated November 9, 1889; of Great Britain, No. 765, dated January 15, 1890; of Belgium, No. 89,183, dated January 16, 1890; of France, No. 202,756, dated March 15, 1890, and of Austria-Hungary, No. 2,138 and No. 14,281, dated April 27, 1890. The aforesaid British patent I caused to be obtained, said patent having been issued to Newnham Browne as a communication from myself.

The present invention relates to an arrangement or apparatus for application to photographic cameras carrying several plates simultaneously, (such, for instance, as are known as "detective-cameras,") enabling an exposed plate to be rapidly changed for a fresh or unexposed plate, so that a fresh exposure may be made with a loss of a few seconds only.

The present improvements are illustrated in the accompanying drawings, wherein—

Figure 1 is a vertical cross-section of a camera provided with the present improvements. Fig. 2 is a vertical section in a plane indicated by the line A B in Fig. 1. Fig. 3 is a vertical section in a plane indicated by the line C D in Fig. 1. Fig. 4 is a horizontal section in a plane indicated by the line E F in Fig. 1. Fig. 5 is a horizontal section in a plane indicated by the line G H in Fig. 1. Fig. 6 is a detail sectional view of one end of one of the racks which move the plate-carriers. Fig. 7 is a horizontal section of a carrier on a reduced scale, showing the relation of the present improvements to the photographic lens.

The camera is made of suitable width and contains two divisions or compartments, each containing half the number of plates to be carried by the camera. Each plate is carried by a frame or by other suitable means.

In the drawings a camera is shown intended to carry twelve plates, six in each compartment, and $a\ a$ indicate the usual plate frames or carriers such as are commonly employed in photography.

On the rear of that compartment which faces the lens and on the front of the second compartment springs $b$ are arranged at top and bottom. Each pair of these springs acts upon the frame of the plate nearest thereto, and so pushes such frame and the others behind it against the side of the compartment opposite to the springs that the frame $a$ of the foremost plate in the one case and the rearmost in the other lies close to corresponding side of the compartment, while at the other side (where the springs $b$ are) space enough remains for one frame in each compartment. Between the two compartments a vertical arbor $c$ is provided, which is at the top, outside the camera, fitted with a crank $c'$. Above and beneath the plate-carriers $a$ toothed wheels $d$ and $d'$ are provided on the arbor $c$, these wheels being cut alike. Parallel to the frames $a$ are pairs of toothed racks $e$ and $f$ and $e'$ and $f'$, engaging with the wheels $d\ d'$. One pair of racks corresponds to the foremost plate and one to the rearmost plate or frame $a$. On each rack a spring $g\ g'$ and $h\ h'$, (one of which is shown in detail in Fig. 6) is provided, the free ends of said springs being hook-shaped. The racks $e\ f$ and $e'\ f'$ are by the wheels $d\ d'$ moved in opposing directions, and the size and position of the wheels must be determined so as to suit the camera.

The operation of this arrangement is as follows: Suppose that the two racks engaging with the lower wheel $d'$ are in the position shown in Fig. 5, so that they are underneath the foremost and the rearmost frames $a$, respectively, and in their extreme position. Then the racks gearing with $d$ must be just above the lower ones—*i. e.*, the rack $e$ above $e'$ and $f$ above $f'$. When the racks are in this position, the hooks on the springs $g\ g'$ and $h\ h'$ engage with the corners of the frames between them. Now if by means of the arbor $c$ the wheels $d\ d'$ are rotated from right to left the racks $e\ e'$, and with them the plate held by the springs $g\ g'$, will travel from right to left, and the racks $f\,f'$, with the plate or frame $a$ held by the springs $h\,h'$, passes from left to right. Both the plates or frames thus set in motion find free access into that compartment to which they are carried. As each of the moving plates finds firm support on the others contained in the same compartment it is enabled to depress the springs $b\,b$. As soon as the outgoing plate has left the compartment all the plates in the compartment, including the incoming one, are pushed forward (or backward) by the springs $b$ acting on the frame last arrived in the compartment until the outermost frame $a$ bears against the side of the compartment, as shown in Fig. 4. When the frames $a$ in traveling reach the opposite end of the camera, they have assumed their final position. By the operation just described an exposed plate has been moved from the compartment facing the lens to the second compartment and a fresh one from the second compartment to the first. If now the wheels $d\,d'$ are turned from left to right, the parts of the mechanism resume their original position. When the return motion begins, the hooks of springs $g\,g'$ and $h\,h'$ will by their inclined faces slide under or over the frames and the springs fall into grooves in the racks, so that no obstacle to the movement of the latter is presented. When the racks have again reached their original position, Figs. 1 and 5, the compression of the springs $g\,g'$ and $h\,h'$ pushes the hooks forward and causes them to engage with the frames for the next change. It will be noted that the racks $e\,f$ $e'\,f'$ constitute reciprocating slides or carriers which move back and forth through the ports or apertures which establish communication between the two plate-holding compartments and which serve to transfer the plates which register with said ports or apertures from one of said compartments to the other.

What I claim as my invention, and desire to secure by Letters Patent of the United States, is—

A photographic camera having two separated compartments, each capable of holding a plurality of plates, said compartments communicating with each other at both their front and rear ends by means of apertures or ports sufficient in size to permit the edgewise passage of the plates, movable slides or carriers consisting of racks $e\,e'\,f\,f'$, the racks $e$ and $e'$ moving back and forth in line with the front one of said ports or apertures and the other racks $f\,f'$ moving back and forth in line with the rear one of said ports or apertures, and means for reciprocating said slides or carriers, said means consisting of a rotary shaft $c$, carrying toothed wheels $d\,d'$, said toothed wheel $d$ engaging at diametrically-opposite points with said racks $e\,f$ and said toothed wheel $d'$ engaging at diametrically-opposite points with said racks $e'\,f'$, whereby when said shaft is rotated said racks $e\,e'$ move in one direction and said racks $f\,f'$ move in the opposite direction, and said racks $e\,e'\,f\,f'$ having spring-catches $g\,g'\,h\,h'$, respectively, which engage the plates, in combination with springs $b\,b$ in both of said compartments, which maintain the plates in one compartment in such position that the rear plate registers with the rear one of said ports or apertures and is located so as to be acted upon by the rear racks $f\,f'$ and which maintain the plates in the other compartment in such position that the front plate registers with the front one of said ports or apertures and is located so as to be acted upon by the front racks $e\,e'$, substantially as set forth.

FRIEDRICH AUGUSTE FICHTNER.

Witnesses:
CARL HÜTTIG,
F. A. ZÖBISCH.